United States Patent
Mahapatra et al.

(10) Patent No.: US 10,120,744 B1
(45) Date of Patent: Nov. 6, 2018

(54) GRAPH EXECUTION SYSTEM AND METHOD FOR A COMPUTING ENVIRONMENT

(71) Applicant: VCE Company, LLC, Richardson, TX (US)

(72) Inventors: Akshaya Mahapatra, San Jose, CA (US); Vandana Rao, San Jose, CA (US)

(73) Assignee: VCE IP Holding Company LLC, Richardson, TX (US)

( * ) Notice: Subject to any disclaimer, the term of this patent is extended or adjusted under 35 U.S.C. 154(b) by 231 days.

(21) Appl. No.: 14/947,413

(22) Filed: Nov. 20, 2015

(51) Int. Cl.
*G06F 11/00* (2006.01)
*G06F 11/07* (2006.01)

(52) U.S. Cl.
CPC ........ *G06F 11/079* (2013.01); *G06F 11/0745* (2013.01); *G06F 11/0751* (2013.01); *G06F 11/0793* (2013.01)

(58) Field of Classification Search
CPC .. G06F 11/323; G06F 9/5038; G06F 11/3604; G06F 2201/865; G06F 2221/034; G06F 11/3409; G06F 11/3466; G06F 11/079; G06F 11/0745; G06F 11/0751; G06F 11/0793
See application file for complete search history.

(56) References Cited

U.S. PATENT DOCUMENTS

| | | | | |
|---|---|---|---|---|
| 5,966,072 A * | 10/1999 | Stanfill | ................. | G06F 9/5038 340/440 |
| 6,625,797 B1 * | 9/2003 | Edwards | ................. | G06F 8/447 702/108 |
| 2004/0006765 A1 * | 1/2004 | Goldman | ................ | G06F 8/315 717/116 |
| 2006/0230311 A1 * | 10/2006 | Kao | ........................ | G06F 9/466 714/16 |
| 2009/0030863 A1 * | 1/2009 | Stanfill | ................... | G06F 9/466 706/45 |
| 2013/0232452 A1 * | 9/2013 | Krajec | .................. | G06F 3/0482 715/840 |

* cited by examiner

Primary Examiner — Jason B Bryan
(74) Attorney, Agent, or Firm — Polsinelli PC (57) ABSTRACT

A computing environment provisioning system includes a processing system and a memory for storing instructions that are executed by the processing system to obtain a graph having one or more edges with multiple vertices representing task instructions to perform multiple tasks on one or more resources of a computing environment, and sequentially execute the task instructions according to the edges between the vertices. When an at least one task encounters an error, the instructions pause execution of an ensuing task instruction in the graph.

18 Claims, 8 Drawing Sheets

GRAPH EXECUTION SYSTEM AND METHOD FOR A COMPUTING ENVIRONMENT

TECHNICAL FIELD

Aspects of the present disclosure relate to computing devices and, in particular, to a graph execution system and method for a computing environment.

BACKGROUND

Computing resources used by enterprises, such as corporations and universities, are often provided by multiple computing devices (e.g., hardware resources) that function in a collaborative manner to meet the computing resource needs of the enterprise. Early integration of computing devices to achieve such collaboration was relatively complex and difficult due to many reasons including the relative independence of the various technologies. To remedy these problems and make compute collaboration more efficient, among other advantages, virtual computing environments were introduced that provided a standardized package of components combined into a single, optimized computing solution. Virtual computing environments typically include a structured combination of multiple virtual objects that are executed on independently functioning hardware resources commonly referred to as hosts. Deployment of these virtual computing environments often involve execution of one or more scripts and/or workflows to perform various functions, such as installation of applications on the hardware and software resources as well as setting of various parameters to be used by the resources of the converged infrastructures, virtual computing environments, or computing resources.

SUMMARY

According to one aspect of the present disclosure, a computing environment provisioning system includes a processing system and a memory for storing instructions that are executed by the processing system to obtain a graph having one or more edges with multiple vertices representing task instructions to perform multiple tasks on one or more resources of a computing environment, and sequentially execute the task instructions according to the edges between the vertices. When a at least one task encounters an error, the instructions pause execution of an ensuing task instruction in the graph.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters may refer to the same parts throughout the different views. The drawings depict only typical embodiments of the present disclosure and, therefore, are not to be considered limiting in scope.

DETAILED DESCRIPTION

Embodiments of the present disclosure provide a system for managing the resources of a computing environment using a graph, which may be interactive, that when executed, performs certain tasks on the resources, and displays the progress of the task instructions on a display. Additionally, the graph, which may be interactive, may be paused during its execution in response to any errors generated by a previously executed task instruction. Although conventional resource management systems have provided for the execution of multiple tasks using task lists commonly referred to as workflows, these conventional systems execute task lists statically and generally do not allow their modification during execution, which can become problematic when one task instruction in the task list fails, thus causing most or all ensuing tasks to fail. Embodiments of the present disclosure provide a solution to this problem by executing among others, a graph in which the progress of each task instruction can be monitored on a display, and can be paused in response to a failure of a previously executed task so that remedial action can be taken. The remedial action may include, for example, generating a user interface for receiving configuration changes to remedy the failed task, insertion of one or more additional tasks into the graph, skipping one or more tasks that have failed, and/or roll back of one or more of the previously executed tasks.

Computing environments often include a combination of computing resources that are packaged and interconnected in a standardized manner for ease of maintenance and use. Computing environments such as these are often implemented in environments where relatively high reliability and/or availability are desired, such as in an enterprise environment. Examples of such computing environments may include computer clusters, computing grids, blade arrays, distributed computing environments, and converged infrastructures. Computing environments that function with a virtual computing environment are often referred to as converged infrastructures or integrated infrastructures. Computing systems such as these often include multiple hardware resources (e.g., hosts) that each executes one or more virtual resources (e.g., virtual objects).

Converged infrastructures may involve multiple computing components pre-integrated into an optimized computing solution. The computing components of a converged infrastructure solution may include servers, data storage components, networking equipment and software for managing the integrated components. To assist in the scalability, management and sharing of resources, particularly in large computing system environments, converged infrastructures may involve a pool of server, storage and networking capacities, typically virtualized, that can shared by multiple applications. One particular example of a converged infrastructure includes a Vblock™ System infrastructure package available from VCE, LLC, which is headquartered in Richardson, Tex.

To efficiently manage these computing environments, computing environment management tools have been developed. Examples of such computing environment management tools include a vCenter Orchestrator™ and a UCS Director™ management tools. These computing environment management tools provide scriptable building blocks to perform management and orchestration tasks, such as provisioning of the resources of virtualized computing environments. The scriptable building blocks are arranged in a task list commonly referred to as a workflow that includes a number of tasks to be sequentially performed by one or more resources of a computing environment. For example, a typical task list may include the following tasks: i. provision a blade computing device in the computing environment, ii. provision a storage partition in the computing environment, iii. boot the blade computing device, iv. configure a communication link between blade computing device and storage partition, and v. map the storage partition in the computing environment. The conventional computing environment management tools execute the above example task list sequentially. However, these task lists are typically static and do not allow modification of currently executing tasks even when modifying them would not significantly affect their operation. Also these conventional computing environment management tools do not provide for dynamic injection of other tasks while the workflow is running.

The static structure of the task list is advantageous for short tasks since it makes the operations performed by the task list predictable and understandable. However this causes problems for long running tasks (e.g., host/storage provisioning) especially if the task execution sequence cannot be modified or new tasks cannot be injected. In some cases, this behavior may cause problems due to the fact that certain tasks may be dependent upon a previously executed task. Therefore, if a previous task fails, any ensuing tasks may invariably fail. To solve this problem, the conventional computing environment management tools handle this problem by executing certain de-provisioning tasks to undo the previously executed tasks. However, since many task lists may require hours if not days to perform, this de-provisioning operation can be very time consuming and cumbersome to perform.

Figure 1A:
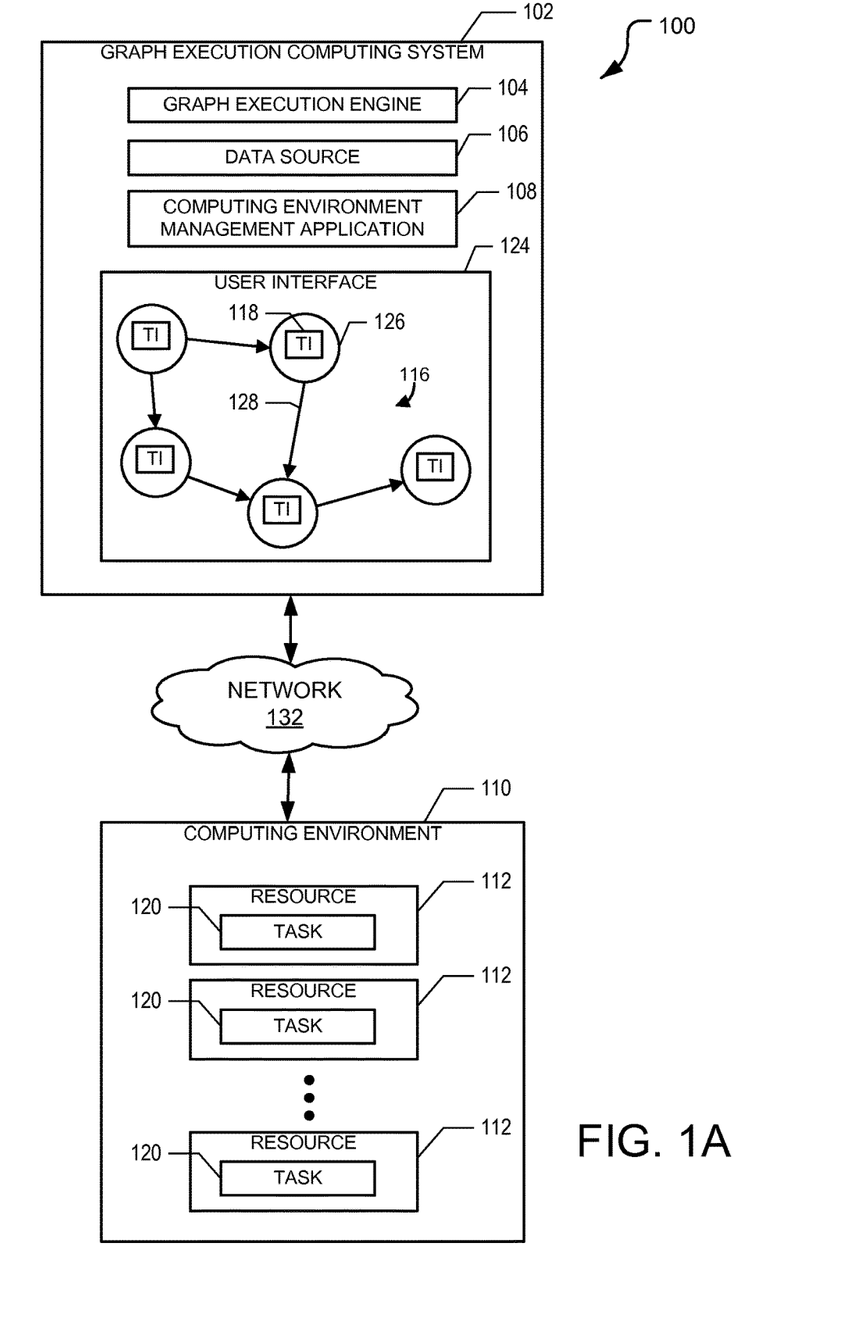
FIGS. 1A and 1B illustrate an example graph provisioning system and associated data source according to one embodiment of the present disclosure.

FIG. 1A illustrates an example graph provisioning system 100 according to the teachings of the present disclosure. The system 100 includes a graph execution computing system 102 that includes a graph execution engine 104, a data source 106, and a computing environment management application 108. The graph execution engine 104 communicates with a computing environment 110 to manage the provisioning of certain resources 112 of the computing environment 110 using a graph 116 that includes task instructions (TI) 118 associated with tasks 120 performed on the resources 112. As will be described in detail below, the graph execution engine 104 displays the progress of each task instruction 118 performed by the graph execution engine 104, and may pause execution of the task instructions 118 when a previous task instruction encounters an error so that remedial action may be taken.

Figure 2A:
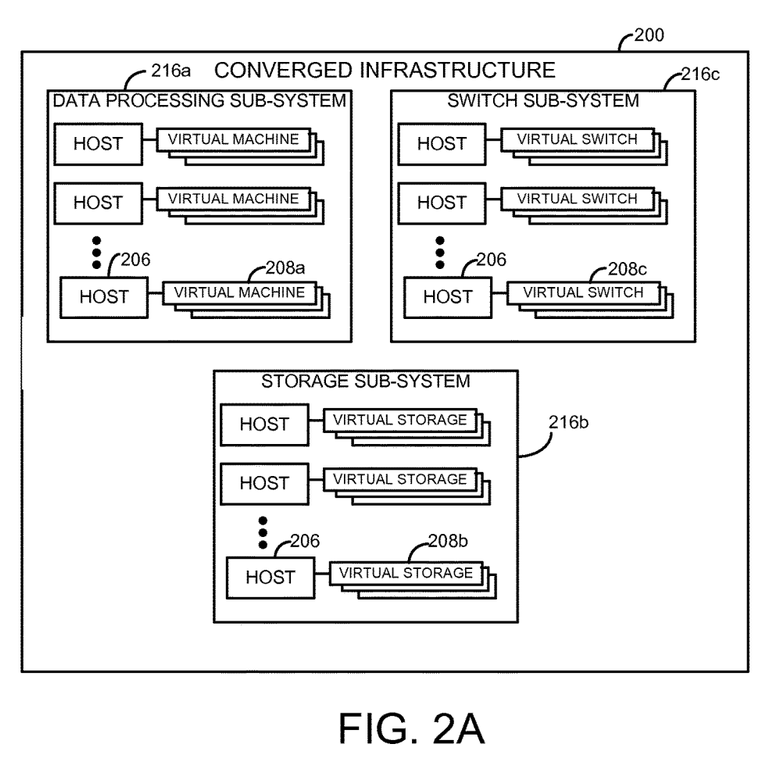
FIGS. 2A and 2B illustrate an example converged infrastructure that may be provisioned by the resource provisioning system of FIG. 1 according to one embodiment of the present disclosure.

In a specific example of a computing environment 110 that includes a converged infrastructure (CI), the resources 112 may include hardware resources (e.g., hosts 206) and/or virtual resources (e.g., virtual machines 208a, virtual switches 208b, and/or virtual storage objects 208c) executed by the hosts 206 of the converged infrastructure (See FIG. 2). In general, provisioning of a computing environment 110 may incur numerous dependencies that require a sequenced provisioning of its resources 112. For example, a typical computing environment 110 may have over 3,000 physical hosts that each executes over 20 virtual objects. Embodiments of the present disclosure provide a graph execution engine 104 that executes task instructions 118 in an easily viewable form on a user interface 124, and halts execution of ensuing task instructions when a previous task instruction 118 fails so that remedial action may be taken.

One example dependency may include one that requires a host 206 to be provisioned prior to a virtual object that is to be executed on that host be provisioned. Thus, that virtual object is considered to be a dependent resource of its associated host. Another example dependency may include one that requires a virtual storage object 208c be provisioned prior to a virtual switch 208b being allocated to that provisioned virtual storage object 208c. Thus, the virtual switch 208b is considered to be a dependent resource of that virtual storage object 208c. Additional example dependencies will be described in detail herein below.

Generally speaking, the graph execution engine 104 manages execution of task instructions 118 that are arranged in a graph 116 as vertices 126 configured with edges (e.g., arrows) 128 in between. To execute the task instructions 118, the graph execution engine 104 traverses through the graph 116 and executes each task instruction 118 associated with its respective vertex 126 in sequential form or in some cases, non-sequentially, or in parallel, as defined by the edges 128 arranged between the vertices 126. Each task instruction 118, when executed by a resource 112 of the computing environment 110, performs a task 120 in association with the resource it is executed on. The task 120 performed may include, for example, launching applications, setting environment variables of the operating system and/or hardware components of the resource, and/or even calculating values to be used for setting the environment variables.

In one embodiment, the graph execution engine 104 uses a graph software program to organize and store task instructions 118 as vertices and edges representing a sequence in which the task instructions are to be executed. One example of a suitable graph software program that may be used includes a Titan™ graph software program, which is released under an open source license from the Apache Software Foundation in Forest Hill, Md. The Titan™ graph software program is written using Java code, and is a distributed, real-time, scalable transactional database that allows simultaneous use by multiple users. Nevertheless, other graph software programs may be implemented with the graph execution engine 104 without departing from the spirit or scope of the present disclosure.

The graph execution engine 104 may use the Titan™ graph software program to traverse the graph 116 from its starting point at the first task instruction 118 to the last task instruction 118. That is, the graph execution engine 104 obtains a first task instruction 118 from the graph software program, and manages execution of the first task instruction 118 on the resource 112. In the event that the first task instruction 118 has executed successfully, the graph execution engine 104 then obtains the ensuing task instruction 118 according to the edge associated with the first task instruction 118, and manages execution of the ensuing task instruction 118 on the same or a different resource 112. However, in the event that the first task instruction 118 fails (e.g., generates an error). The graph execution engine 104 pauses execution of any ensuing tasks 120 so that remedial action may be taken.

Embodiments of the present disclosure may provide an advantage in that execution of multiple sequential tasks may be performed in a manner that provides for remedial action in the event that a previous task, upon which ensuing tasks may be dependent, fails. Remedial action may include, for example, automatic execution of one or more remediation graphs 130 to cure the error, displaying a user interface 124 to receive user input for curing the error, skipping one or more tasks that have failed, and/or performing a roll back operation to un-provision (e.g., undo) the previous task 120. Whereas conventional resource provisioning systems typically do not provide for such remedial actions in the event of an error, their operation may incur an undue burden due to lost time and effort required to un-provision multiple tasks that may fail due to their dependencies upon a previously executed task 120. Embodiments of the present disclosure provide a solution to this problem by pausing the graph 116 whenever an error is incurred in a task instruction 118 so that remedial action may be immediately provided.

In one embodiment, the graph execution engine 104 communicates with a computing environment management application 108 to manage the execution of the task instructions 118 on the resources 112 of the computing environment 110. Any suitable type of computing environment management application 108 may be implemented with the teachings of the present disclosure. Examples of suitable computing environment management applications include a vCenter Orchestrator™ software suite that is available from VMware Corporation, which is headquartered in Palo Alto, Calif., or a UCS Manager™ that is available from Cisco Systems, which is headquartered in San Jose, Calif.

Figure 1B:
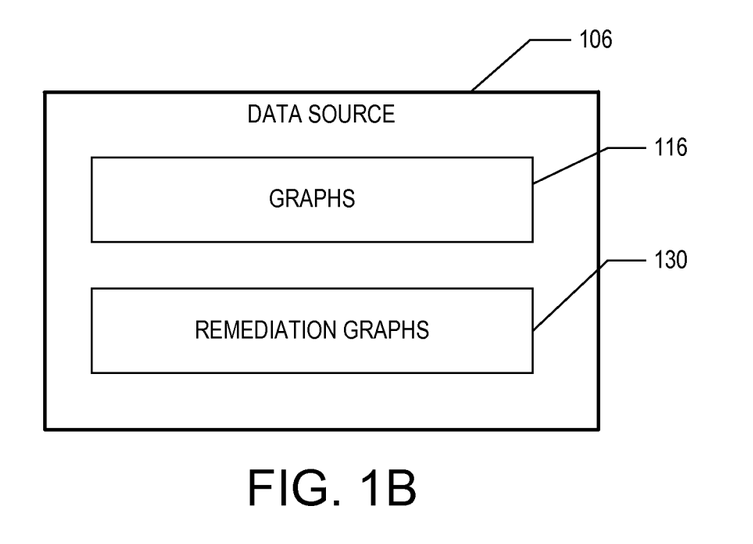

The data source 106 stores graphs 116 and remediation graphs 130. The graphs 116 may include task instructions for performing various provisioning operations in which certain tasks may be dependent upon successful completion of previous tasks. Such provisioning operations may include, provisioning of one or more resources (e.g., compute devices, network devices, storage devices, etc.), or provisioning of an environment that is to be used for executing an application. The remediation graphs 130 include task instructions that may be used for performing one or more remedial tasks when a task executed within a graph 116 fails. For example, in the event that a task to provision a communication link between two resources 112 fail, a remediation graph 116 may be executed to roll back the previously executed task, and execute other tasks so that the communication link may be successfully established.

The graph execution computing system 102 and the computing environment 110 communicate with one another in any suitable manner, such as using wireless, wired, and/or optical communications. In one embodiment, the graph execution computing system 102 and the computing environment 110 communicates with one another using a communication network 132, such as the Internet, an intranet, or another wired and/or wireless communication network. In another embodiment, the graph execution computing system 102 and computing environment 110 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the graph execution computing system 102 and computing environment 110 may communicate with one another without the use of a separate and a distinct network. Although only one computing environment 110 is shown herein, it is contemplated that embodiments of the graph execution engine may be applied to any quantity of computing environments, such as two or more computing environments 110.

Figure 2B:
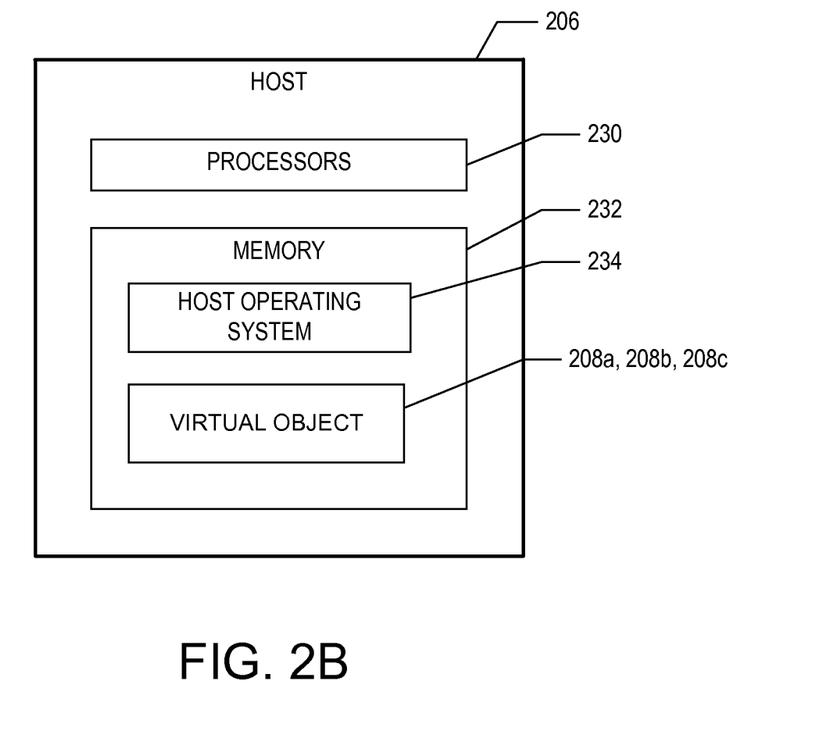

FIGS. 2A and 2B illustrate an example converged infrastructure 200 that may be implemented as the computing environment 110 according to the teachings of the present disclosure. The converged infrastructure 200 may include multiple hosts 206 that each executes one or more virtual objects (e.g., virtual machines 208*a*, virtual storage objects 208*b*, and virtual switch objects 208*c*). The hosts of a converged infrastructure are often referred to as compute servers. Nevertheless in this disclosure, the term host may be interpreted as any physical device and/or component of the converged infrastructure that support the operation of virtual resources and services provided by those virtual resources. The hosts 206 of the converged infrastructure 200 and the virtual objects 208*a*, 208*b*, and 208*c* may be collectively referred to as the resources 112 whose provisioning may be controlled by the graph execution engine 104.

The particular computing environment 110 as shown includes several sub-systems, such as a data processing sub-system 216*a*, a data storage sub-system 216*b*, and a switch sub-system 216*c*. Nevertheless, it should be understood that other computing environments 110 may include additional, fewer, or different types of sub-systems without departing from the spirit and scope of the present disclosure.

In one aspect, each computing environment 110 includes a combination of the previously described sub-systems or other sub-systems that are packaged and interconnected in a standardized manner for ease of maintenance and use. Computing environments such as these are often implemented in environments where relatively high reliability and/or availability are desired, such as in an enterprise environment. Nevertheless, it is contemplated that other computing environments and computing environment, such as a computer cluster, computing grid, blade array, and/or other computing environment may be managed using the teachings of the present disclosure. For example, a computing environment 110 such as that shown includes components found in VBLOCK™ System infrastructure packages available from VCE, LLC, which is headquartered in Richardson, Tex.

In one aspect, the data storage sub-system 216*b* includes computer-readable memory structures for storing data used by the computing environment 110, which may include network attached storage (NAS) arrays and/or storage area network (SAN) arrays that are associated with virtual objects (e.g., virtual storage objects 208*b*). The switch sub-system 216*c* provides for communication among the various sub-systems of the computing environment 110, and may include components, such as fabric interconnect systems, Ethernet switches/routers, multilayer director switches (MDSs), and the like. The data processing sub-system 216*a* executes applications that access, store, and otherwise manipulate data stored by the computing environment 110. For a particular example, either of the data storage sub-system 216*b*, the switch sub-system 216*c*, and/or the data processing sub-system 216*a* may comprise a blade computing platform having multiple hosts (e.g., blade computing devices) 206 that each executes one or more virtual objects.

Each sub-system includes multiple hosts 206 that each executes one or more virtual objects, which in this particular example, are virtual machines (VMs) 208a, virtual storage objects 208b, and virtual switch objects 208c. For example, virtual objects, such as the VMs 208a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMWARE ESX™ software suite that is available from VMware Corporation, which is headquartered in Palo Alto, Calif.

The hosts 206 of each sub-system 216 generally refer to the hardware resources of the computing infrastructure, while the virtual objects 208 of each sub-system 216 generally refer to virtual resources of the computing infrastructure. Virtual resources may also include one or more logical configuration constructs that may be provisioned by the graph execution engine 104. For example, one type of logical configuration construct includes a tenant partition in which certain resources are allocated for use by each tenant (e.g., user). For example, one tenant partition may dedicate the use of a certain number of virtual machines 208a, virtual switches 208b, and virtual storage units 208c to be used by one tenant, while another tenant partition may dedicate the use of other virtual machines 208a, virtual switches 208b, and virtual storage units 208c. Additionally, each tenant partition may specify certain levels of performance to be maintained by the virtual computing environment, such as a specified level of data throughput to be transmitted through the cloud computing environment, and/or a specified level of processing load to be provided by the cloud computing environment.

FIG. 2B depicts an example host 206 implemented on the converged infrastructure 200 according to one aspect of the operations management system 100. The host 206 is a computing or processing device that includes one or more processors 230 and a memory 232. For example, the host 206 can be a personal computer, such as a laptop or notebook computer, a workstation, or other processing device such as a personal digital assistant or a tablet computer. In a particular embodiment, the host 206 is a rack mounted host, such as blade host in which multiple blade hosts share a common backplane for communication with one another and for receiving power from a rack mounted power distribution unit. The memory 232 stores a host operating system 234 and one or more virtual objects (e.g., VMs 208a, virtual storage objects 208b, and virtual switch objects 208c) defining virtual objects that are executed by the processor 230. The host operating system 232 controls and manages the operation of the virtual objects executed on the host 206. For example, control signaling for starting, stopping, and/or changing operating parameters of each virtual object is managed through the host operating system 234.

Although FIGS. 2A and 2B illustrate a single converged infrastructure may be provisioned by the resource provisioning system 100, it is contemplated that the system 100 may be used to provision multiple converged infrastructures, such as those arranged in a cloud computing environment or other distributed computing environment. One example of such an environment may include multiple converged infrastructures that are deployed at a single location or at different locations for enhanced processing throughput. For another example, multiple converged infrastructures may be deployed at a single location of at different locations to provide redundancy for enhanced reliability and/or availability of the overall computing environment provided thereby. Embodiments of the present disclosure may provide a resource provisioning system that coordinates the provisioning of resources for each of these types of computing environments.

Figure 3:
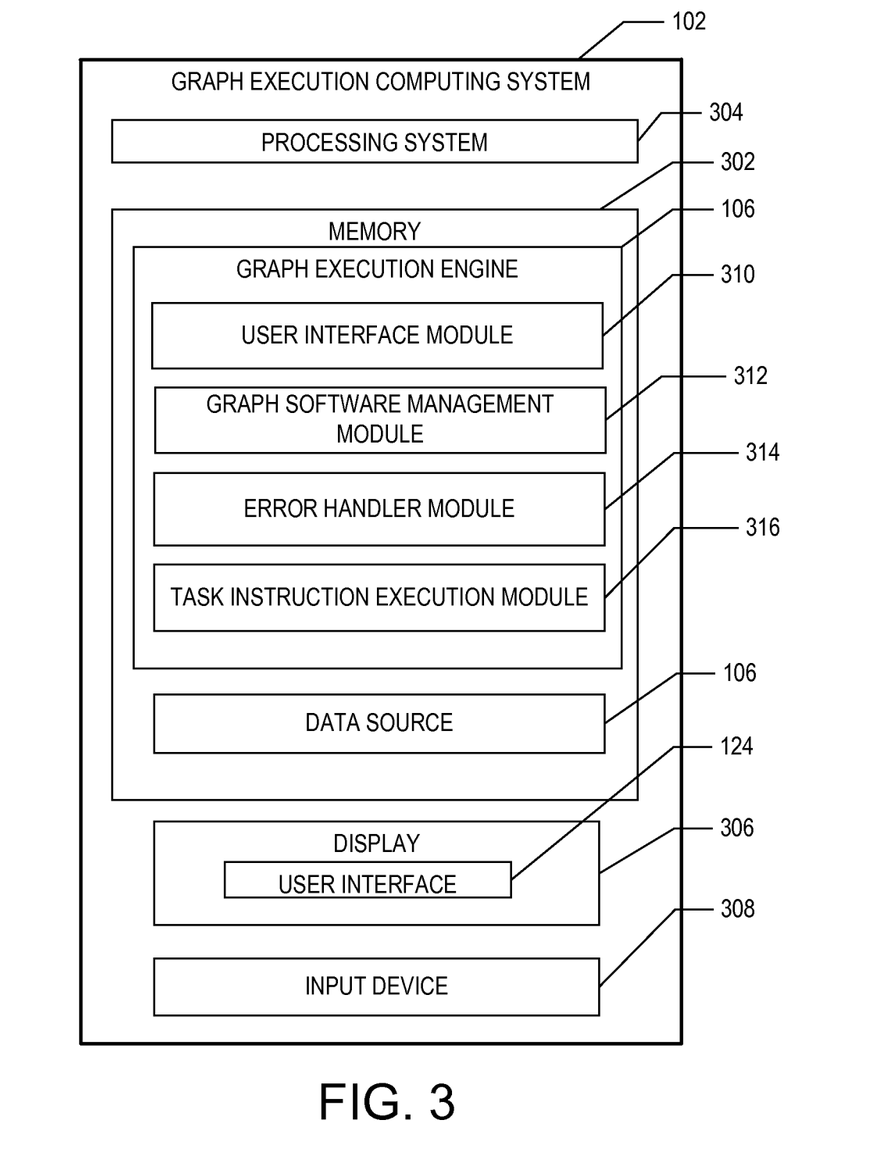
FIG. 3 illustrates an example computing environment computing system that may be used to execute the graph execution engine according to one embodiment of the present disclosure.

Referring now in more detail to FIG. 3, a block diagram of an example graph execution engine 106 executed on the graph execution computing device 102 is depicted according to one aspect of the present disclosure. The graph execution engine 106 is stored in a memory 302 (i.e., computer readable media) and is executed on a processing system 304 of the graph execution engine computing device 102. The computing system 102 may include any type of computing system, such as one or more management computing systems, personal computers, mobile computers and/or other mobile devices, and other hosts.

The memory 302 includes volatile media, nonvolatile media, removable media, non-removable media, and/or another available medium. By way of example and not limitation, non-transitory memory 302 comprises computer storage media, such as non-transient storage memory, volatile media, nonvolatile media, removable media, and/or non-removable media implemented in a method or technology for storage of information, such as computer readable instructions, data structures, program modules, or other data.

According to one aspect, the graph database management application computing system 102 also provides the user interface 124, such as a graphical user interface (GUI) or a command line interface (CLI), which is displayed on a display 306, such as a computer monitor, for displaying data. The graph database management application computing system 102 also includes an input device 308, such as a keyboard or a pointing device (e.g., a mouse, trackball, pen, or touch screen) to enter data into or interact with the user interface 124. According to one aspect, the graph database management application 104 includes instructions or modules that are executable by the processing system 304 as will be described in detail herein below.

A user interface module 310 displays graph information to be used for provisioning the resources 112 of the computing environment. The user interface module 310 may also generate the user interface 124 to facilitate receipt of input data from a user. The user interface module 310 may display information to, and receive user information from the user in any suitable form, such as via a graphical user interface (GUI) or a command line interface (CLI). The user interface module 310 may display any type and number of input fields for receiving user input and displaying responses to the user input. For example, the user interface module 310 may display an error generated by a previously executed task instruction, and display one or more entry fields to receive selection of a remedial action to be taken by the user.

A graph software management module 312 manages various functions of the graph software package, such as generating a new graph, editing or deleting an existing graph, communicating with the graph software package to obtain task instructions 118 to be executed on the resources of the computing environment, halt traversal through the graph 116 when desired by the user, and the like. In one embodiment, the database management module 312 includes a Titan™ software program that creates and manages graphs according to embodiments of the present disclosure.

An error handler module 314 detects and manages errors generated by the tasks 120 executed on the resources 112 of the computing environment 110. The error handler module 314 detects errors in any suitable manner. In one embodiment, the error handler module 314 detects errors by receiving information associated with the performance of executed tasks 120 from the computing environment management application 108. In another embodiment, may perform one or more tests to verify whether a previously executed task 120 has completed successfully or not. For example, the error handler module 314 may detect whether a communication link has been successfully established between two resources 112 by instructing a first resource to send a ping message to the other resource using the newly established communication link. The error handler module 314 detects that the communication link has failed when the ping message is unsuccessful.

The error handler module 314 manages errors generated by the tasks 120 by pausing the execution of any ensuing task instructions. The error handler module 314 may also perform one or more remedial actions to cure the failed task. For example, the error handler module 314 may roll back the previously executed task, such as by un-provisioning a resource 112 that has been provisioned by the previous task. As another example, the error handler module 314 may generate a user interface 124 for received remediation input from the user.

In one embodiment, the error handler module 314 may automatically perform one or more remediation graphs 130 according to the type of error detected. For example, the error handler module 314, upon determining that the error was generated due to installation of a software package that is not compatible with the resource, automatically select a remediation graph 116 that installs a compatible software package on the resource.

A task instruction execution module 316 manages the execution of the task instructions 118 in a graph 116. For example, the task instruction execution module 316 may commence execution of a first task instruction 118 in the graph 116, and upon successful execution of the first task instruction, execute a second task instruction 118 as defined by the edge associated with the first task instruction. The task instruction execution module 316 may then commence execution of the second task instruction. However, if the second task instruction fails to complete successfully, the task instruction execution module 316 may communicate with the error handler module 314 to perform one or more remedial action to correct the failed task.

In one embodiment, the task instruction execution module 316 communicates with the computing environment management application 108 to manage execution of the task instruction 118. For example, the task instruction execution module 316 may transmit a message to the computing environment management application 108 that includes instructions for executing a particular task 120 on a selected resource 112, and may receive information from the computing environment management application 108 regarding the successful or unsuccessful completion of that task.

It should be appreciated that the modules described herein are provided only as examples, and that the graph execution engine 106 may have different modules, additional modules, or fewer modules than those described herein. For example, one or more modules as described in FIG. 2 may be combined into a single module. As another example, certain modules described herein may be encoded on, and executed on other computing systems, such as on one of the resources 112 of a computing environment 110.

Figure 4:
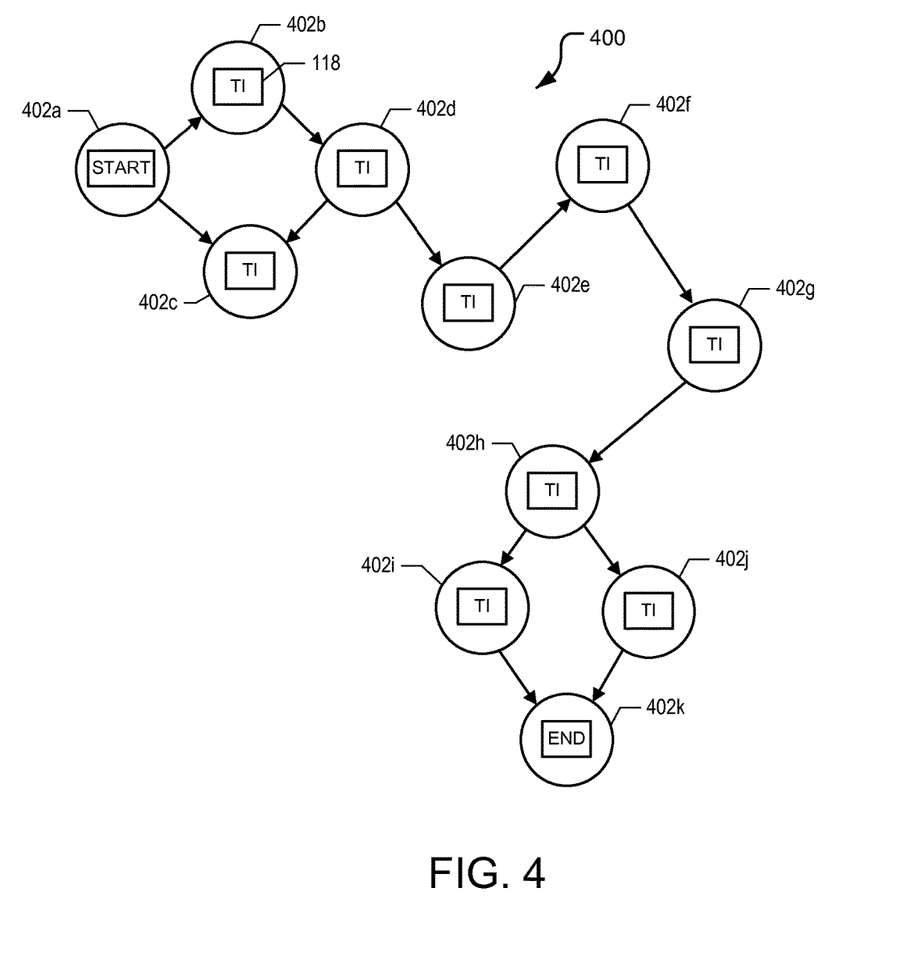
FIG. 4 illustrates an example graph that may be executed by the graph execution engine according to one embodiment of the present disclosure.

FIG. 4 illustrates an example graph 400 that may be executed by the graph execution engine 104 according to one embodiment of the present disclosure. The graph 400 includes eleven vertices 402a-402k that are associated with each other by edges (e.g., arrows) between the task instructions 118 in which the first vertex 402a of the graph 400 represents a starting point for execution of the graph 400, while the last vertex 402k of the graph 400 represents an ending point at which executed ceases. The second vertex 402b through the tenth vertex 402j represents task instructions 118 to be executed by certain ones of the resources 112 of the computing environment 110.

Vertex 402b includes a task instruction to provision a physical host (e.g., a blade). Vertex 402c includes a task instruction to storage for a bootable storage unit (e.g., logical unit number (LUN)). Vertex 402d includes a task instruction to configure the bootable storage unit for the blade provisioned at vertex 402b. Vertex 402e includes a task instruction to boot the physical host provisioned at vertex 402b. Vertex 402f includes a task instruction to install an operating system (OS) image on the bootable storage unit provisioned at vertex 402c. Vertex 402g includes a task instruction to configure networking for the physical layer associated with the physical host and the bootable storage unit. Vertex 402h includes a task instruction to configure networking for the virtual layer associated with the physical host and the bootable storage unit. Vertex 402i includes a task instruction to map the bootable storage unit for operation within a cluster. Vertex 402j includes a task instruction to map the network associated with the physical host and bootable storage unit for operation within the cluster. Thereafter, vertex 402k includes completion of the graph 400.

As shown, certain vertices 402 may be executed concurrently with one another. For example, the task instructions associated with vertex 402b and vertex 402c may be executed concurrently, and the task instructions associated with vertex 402i and vertex 402j may be executed concurrently due to multiple edges emanating from their previous vertices (i.e., vertex 402a and vertex 402h, respectively). Although the graph 400 only shows two vertices that may be executed concurrently, it should be understood that other graphs may possess more than two vertices that may be executed concurrently, such as three or more vertices.

The graph 400 may be displayed on the user interface 124 while be executed by the graph execution engine 104. In one embodiment, the vertex currently being executed may be highlighted on the user interface 124, such as by displaying the currently executed vertex in a different color, a brighter color, or flashing color relative to the other vertices displayed on the user interface 124. In the event that a currently executed task instruction 118 associated with its respective vertex 402 fails to complete successfully, that vertex 402 may be highlighted in yet another form, such as via a red color or other indication that the task instruction has failed.

When a task instruction 118 associated with a particular vertex fails, the graph execution engine 104 may halt further execution of any ensuing task instructions, and/or may perform one or more remediation actions automatically. To perform remediation actions automatically, when a task instruction fails, the graph execution engine 104 may detect the nature of the failure, halt the execution of any ensuing task instructions, and automatically call one or more remediation graphs 130 to correct the failure based upon the nature of the failure. In other cases, the graph execution engine 104 may display an interactive display on the user interface 124 for receiving user input to provide any remediation actions. For example, if the task instruction 118 associated with vertex 402e fails (e.g., booting the physical host), the graph execution engine 104 may halt execution of the task instruction 118 associated with vertex 402f. At this point, the graph execution engine 104 may generate an interactive user interface for receiving user input, such as receiving user input for rolling back the previously executed task (e.g., configure the bootable storage unit for the blade), automatically execute one or more remediation graphs 130 to correct the failure, or wait until the user has manually corrected the problem. In one embodiment, the graph execution engine 104 may perform a reverse traversal of the graph 400 in which a selected quantity of previously executed task instructions 118 may be rolled back. For example, the graph execution engine 104 may receive user input for rolling back the previously executed task instruction immediately preceding the failed task instruction (e.g., the task instruction associated with vertex 402d), or may receive user input for rolling back multiple preceding task instructions (e.g., the task instructions associated with vertex 402d, vertex 402c, and/or vertex 402b).

Although FIG. 4 illustrates one example of a graph 400 that may be executed by the graph execution engine 104 to execute multiple task instructions, it should be understood that other graphs may be implemented without departing from the spirit and scope of the present disclosure. For example, other graphs may include task instructions to establish communication links among the resources 112 of the computing environment, or to the resources of other computing environments. Additionally, other graphs may include instructions to provision a certain set of resources to be used to support operation of an application on those resources. Also, other graphs may include task instructions that may be used to migrate execution of an application from a first set of resources to a second set of resources.

Figure 5:
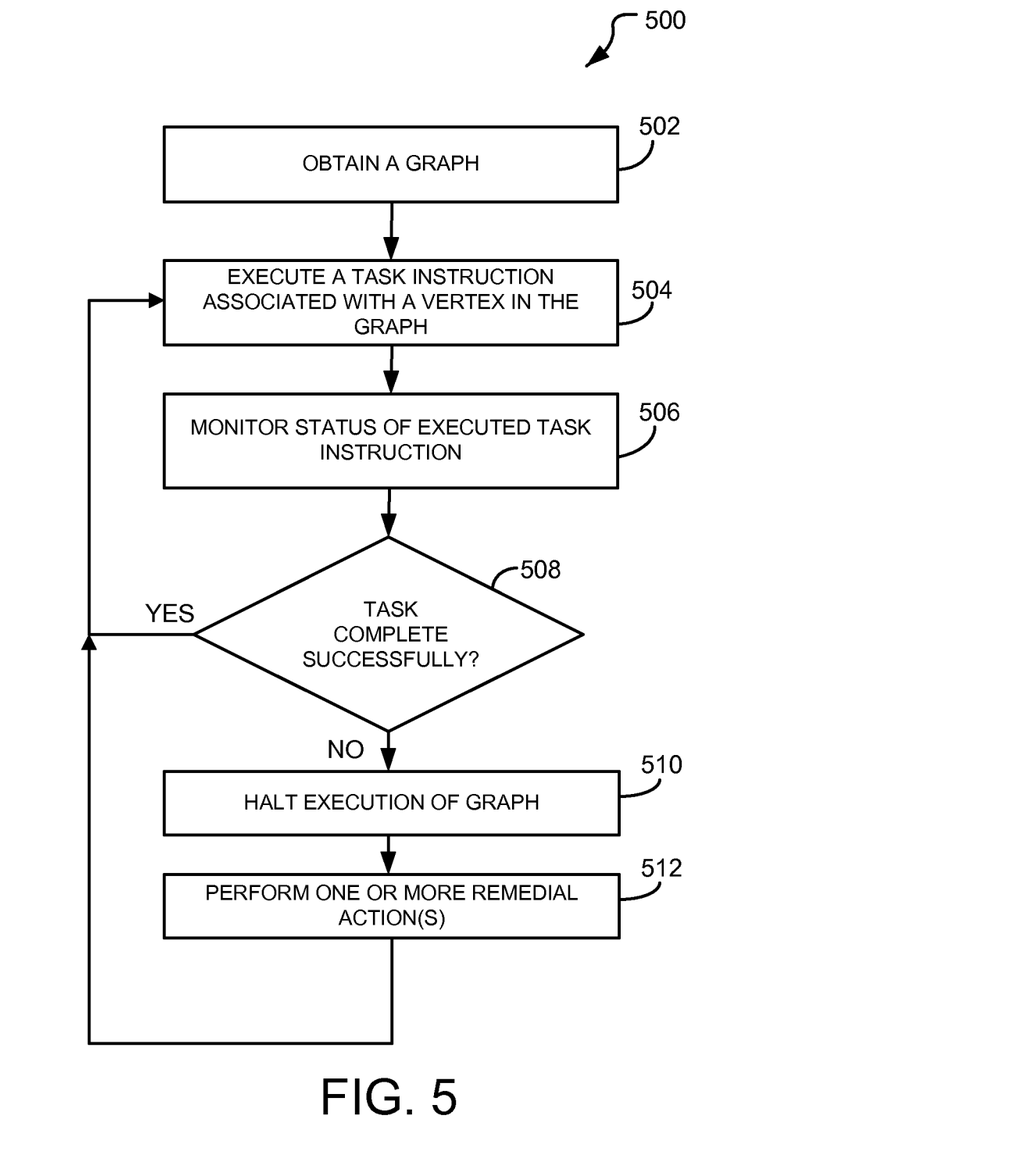
FIG. 5 illustrates an example process that may be performed by the graph execution engine to execute a graph according to one embodiment of the present disclosure.

FIG. 5 illustrates an example process that may be performed by the graph execution engine 104 to execute a graph according to one embodiment of the present disclosure. In step 502, the graph execution engine 104 initially obtains a graph 116 that includes multiple vertices including task instructions to be performed on the resources 112 of a computing environment. In one embodiment, the graph execution engine 104 includes a graph software program and one or more custom code segments. The graph software program organizes and stores the task instructions as vertices and edges representing a sequence in which the task instructions are to be executed, while the custom code segments control the operation of the graph software program to perform the features of the graph execution engine 104 described herein.

In step 504, the graph execution engine 104 executes a task instruction associated with a vertex 126 of the graph 116. For example, the graph execution engine 104 may identify a first vertex 126 in the graph 116 and execute the task instruction associated with the first vertex 126. Thereafter, the graph execution engine 104 monitors the status of the task instruction being executed in step 506. The graph execution engine 104 may communicate with the resource 112 upon which the task instruction is being executed to monitor its progress, or the graph execution engine 104 may communicate with a computing environment management application 108 that manages the execution of the task instruction to monitor the progress of the task instruction. In one embodiment, the graph execution engine 104 displays the vertex 126 associated with the task instruction being executed on a user interface 124. For example, the graph execution engine 104 may display the graph 116 on the user interface 124 in which the vertex 126 associated with the task instruction is highlighted to indicate that it is the currently executed vertex 126.

In step 508, the graph execution engine 104 determines whether the task instruction associated with the vertex has completed successfully. If so, processing continues at step 504, to execute the next one or more task instructions associated with other vertices according to their association with the previous vertex via the edges 128 from the previously executed vertex. However, when the graph execution engine 104 determines that the task instruction did not complete successfully, processing continues at step 510.

In step 510, the graph execution engine 104 halts further execution of any ensuing vertices 126 in the graph 116. While execution of the vertices 126 has been halted, one or more remedial actions may then be taken in step 512. The remedial actions may be taken to correct the fault that caused the task instruction to not complete successfully. For example, the graph execution engine 104 may generate a user interface for receiving user input for correcting the fault condition, such as rolling back the previously executed task. As another example, the graph execution engine 104 may automatically execute one or more remediation graphs 130 to correct the failure. As yet another example, the graph execution engine 104 may wait until the user has manually corrected the problem. Thereafter, the graph execution engine 104 continues processing at step 502 to execute the next task instruction(s) associated with the next vertices 126 in the graph 116 according to the edges 128 from the previous vertex.

The graph execution engine 104 performs the process described above until the vertices 126 have been traversed to execute the task instructions on the resources 112 of the computing environment. Thereafter, the process ends.

Although FIG. 5 describes one example of a process that may be performed by the graph execution engine 104 for calculating and displaying a graph database for the elements of a distributed computing environment, the features of the disclosed process may be embodied in other specific forms without deviating from the spirit and scope of the present disclosure. For example, the graph execution engine 104 may perform additional, fewer, or different operations than those operations as described in the present example. As another example, the steps of the process described herein may be performed on a computing system other than the computing system 102, which may be, for example, one of the resources 112 of the computing environment.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium, such as a computer-readable medium, having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., hard disk), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 6:
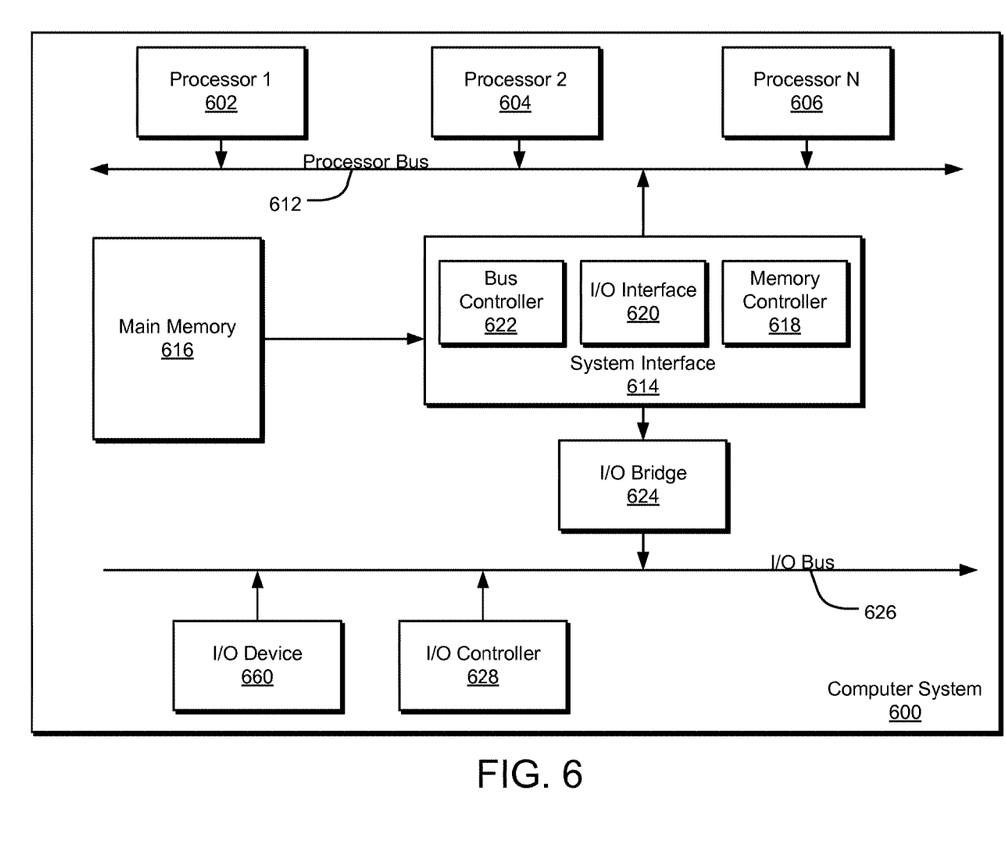
FIG. 6 is a block diagram illustrating an example of a computing device or computer system which may be used in implementing the embodiments of the present disclosure.

For example, FIG. 6 is a block diagram illustrating an example of a host or computer system 600 which may be used in implementing the embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 613 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., hard disk); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A computing environment provisioning system comprising:
    a computing system comprising at least one processor and at least one memory to store instructions that are executed by the at least one processor to:
        obtain a graph comprising a plurality of vertices and a plurality of edges, the plurality of vertices representing task instructions to perform a plurality of provisioning tasks on one or more hardware computing resources to thereby configure the hardware computing resources to execute a virtual computing environment comprising a plurality of virtual objects;
        execute the task instructions according to an execution order defined by the plurality of edges interconnecting the plurality of vertices; and
        when at least one provisioning task of the plurality of provisioning tasks encounters an error:
            pause execution of all ensuing task instructions in the graph;
            select one or more remediation graphs according to a type of the error, wherein the one or more remediation graphs comprise remedial task instructions to cure the error;

execute each of the one or more remediation graphs; and in response to a determination that the detected error has been remediated, resume execution of the ensuing task instructions in the graph.

2. The computing environment provisioning system of claim 1, wherein the instructions are further executed to display at least a portion of the graph on a display, the portion of the graph including a visual identification of one or more current vertices representing one or more task instructions currently being executed.

3. The computing environment provisioning system of claim 1, wherein the instructions are further executed to execute the task instructions by communicating with a computing environment management application that manages operation of the resources, the computing environment management application executing the task instructions.

4. The computing environment provisioning system of claim 1, wherein the instructions are further executed to detect the error by receiving error information from a computing environment management application that manages operation of the resources.

5. The computing environment provisioning system of claim 1, wherein the instructions are further executed to, when at least one task of the plurality of tasks encounters the error, generate an interactive user interface for receiving user input for performing one or more remedial actions to correct the error.

6. The computing environment provisioning system of claim 1, wherein the instructions are further executed to, when at least one task of the plurality of tasks encounters the error, roll back the task instruction associated with the at least one task.

7. The computing environment provisioning system of claim 1, wherein two or more of the vertices have edges in association with a vertex of at least one task of the plurality of tasks, the instructions execute the task instructions associated with the two or more vertices simultaneously.

8. A computing environment provisioning method comprising:

obtaining, using an operations management application stored on a non-transitory medium and executed on at least one processor, a graph comprising a plurality of vertices and a plurality of edges, the plurality of vertices representing task instructions to perform a plurality of provisioning tasks on one or more hardware computing resources to thereby configure the hardware computing resources to execute a virtual computing environment comprising a plurality of virtual objects;

executing the task instructions according to an execution order defined by the edges interconnecting the plurality of vertices;

pausing execution of all ensuing task instructions in the graph when at least one provisioning task of the plurality of provisioning tasks encounters an error;

selecting one or more remediation graphs according to a detected type of the error, wherein the one or more remediation graphs comprise remedial task instructions to cure the error;

executing each of the one or more remediation graphs; and in response to determining that the detected error has been remediated, resuming execution of the ensuing task instructions in the graph.

9. The computing environment provisioning method of claim 8, further comprising displaying each vertex on a display as its respective task instruction is being executed.

10. The computing environment provisioning method of claim 8, further comprising executing the task instructions by communicating with a computing environment management application that manages operation of the resources, the computing environment management application executing the task instructions.

11. The computing environment provisioning method of claim 8, further comprising detecting the error by receiving error information from a computing environment management application that manages operation of the resources.

12. The computing environment provisioning method of claim 8, further comprising, when at least one task of the plurality of tasks encounters the error, generating an interactive user interface for receiving user input for performing one or more remedial actions to correct the error.

13. The computing environment provisioning method of claim 8, further comprising, when at least one task of the plurality of tasks encounters the error, rolling back the task instruction associated with the at least one task.

14. A non-transitory, computer readable medium including instructions that when executed by at least one processor, are operable to perform at least the following:

obtaining a graph comprising a plurality of vertices and a plurality of edges, the plurality of vertices representing task instructions to perform a plurality of provisioning tasks on one or more hardware computing resources to thereby configure the hardware computing resources to execute a virtual computing environment comprising a plurality of virtual objects;

executing the task instructions according to an execution order defined by the edges interconnecting the plurality of vertices;

pausing execution of all ensuing tasks instructions in the graph when at least one provisioning task of the plurality of provisioning tasks encounters an error;

selecting one or more remediation graphs according to a detected type of the error, wherein the one or more remediation graphs comprise remedial task instructions to cure the error;

executing each of the one or more remediation graphs; and in response to determining that the detected error has been remediated, resuming execution of the ensuing task instructions in the graph.

15. The non-transitory computer readable medium of claim 14, the code further operable to perform comprising displaying each vertex on a display as its respective task instruction is being executed.

16. The non-transitory computer readable medium of claim 14, the code further operable to perform executing the task instructions by communicating with a computing environment management application that manages the operation of the resources, the computing environment management application executing the task instructions.

17. The non-transitory computer readable medium of claim 14, the code further operable to perform detecting the error by receiving error information from a computing environment management application that manages the operation of the resources.

18. The non-transitory computer readable medium of claim 14, the code further operable to perform, when the at least one task encounters the error, rolling back the task associated with the at least one task.

* * * * *